Dec. 18, 1934.    O. SLETTEVOLD    1,984,706
SIGNATURE WRITING MACHINE
Filed Dec. 6, 1928    9 Sheets-Sheet 2

Inventor
Ole Slettevold
By Williams Bradbury McCaleb & Hinkle
Attys.

Dec. 18, 1934.    O. SLETTEVOLD    1,984,706
SIGNATURE WRITING MACHINE
Filed Dec. 6, 1923    9 Sheets-Sheet 5

Inventor
Ole Slettevold
By Williams Bradbury McCaleb & Hinkle
Attys.

Dec. 18, 1934. O. SLETTEVOLD 1,984,706
SIGNATURE WRITING MACHINE
Filed Dec. 6, 1923 9 Sheets-Sheet 7

Inventor
Ole Slettevold
By Williams Bradbury McCaleb & Hinkle
Attys.

Dec. 18, 1934.  O. SLETTEVOLD  1,984,706
SIGNATURE WRITING MACHINE
Filed Dec. 6, 1928  9 Sheets-Sheet 9

Fig. 12.

Inventor
Ole Slettevold
By Williams, Bradbury, McCaleb & Hinkle
Attys.

Patented Dec. 18, 1934

1,984,706

UNITED STATES PATENT OFFICE 1,984,706

SIGNATURE WRITING MACHINE

Ole Slettevold, Chicago, Ill., assignor to Hedman Manufacturing Company, Chicago, Ill., a corporation of Illinois Application December 6, 1928, Serial No. 324,134

15 Claims. (Cl. 101—20).

My invention relates to check writing devices and more particularly to a method and a machine by means of which written instruments may be mechanically signed.

One object of my invention is to provide improved means whereby written instruments may be quickly, accurately and conveniently signed.

A further object of my invention is to provide a novel method of affixing signatures to instruments by which the danger of forgery is greatly reduced.

A further object is to provide an improved signature writing machine for written instruments in which the die used to print and scarify the signature may be removed from the machine.

A further object is to provide an improved signature affixing machine in which the signature die may be locked in the machine.

A further object is to provide improved means in the machine to record the number of times it has been operated to impress a signature and to provide operating mechanism for the recording means which is inaccessible for unauthorized operation.

A further object is to provide an improved machine having a recording means for indicating the number of signatures impressed in which the recording device is provided with a key-controlled re-setting device to make re-setting of the recording device impossible without the key.

A further object is to provide an apparatus for signing written instruments which prevents more than one instrument from being signed at one operation.

A further object is to provide an apparatus for signing instruments having means for recording the number of instruments signed in which the possibility of causing a variance between the number recorded and the number signed is practically eliminated.

A further object is to provide an apparatus for signing instruments which is rendered inoperative to sign an instrument when an attempt is made to sign more than one instrument at a time.

A further object is to provide a device for preventing use of the machine on paper of greater than a predetermined thickness.

Other objects and advantages will appear from the following description, reference being had to the accompanying drawings, in which.

In offices and institutions where it is frequently or periodically necessary to issue a great number of checks, bonds or similar negotiable instruments, it is highly desirable to have a machine to sign such instruments. In the past several methods have been employed, such as using machines whereby the signature is written upon a number of checks when the writer signs his name to one of the number. Other methods include a lithographic process whereby the signature is imprinted upon the check. The former method has a disadvantage in that it merely reduces the amount of labor connected with writing signatures, but does not eliminate the necessity of the signer doing the work personally.

The latter method has the disadvantage that it requires elaborate machinery for carrying out the processes and that the method cannot be used by the signer himself or his customary confidential employes, but must be delegated to employes or agents not ordinarily entrusted with such duties.

The machine of my invention overcomes these disadvantages in that it may be readily used to sign either one or any number of checks, drafts, etc., and may be used either by the signer or some clerk in his employ. The machine is relatively simple in construction and operation, so that relatively unskilled clerks may use it, but contains several locking mechanisms and safety features so that the machine cannot be used without the consent of the person whose signature is to be affixed to the negotiable instrument.

When the word "check" is used herein, it shall be construed to include all other types of negotiable instruments, documents or papers to which it may be desired to affix an authorized signature.

The machine of my invention comprises a base 21 having a bed-plate 22 and a plurality of reinforcing ribs 23. The base is substantially hollow and is closed at the bottom by a plate 24 having a plurality of rubber feet 25 for supporting the base upon a table or other suitable support. A plurality of pins 26 is located along each side of the base projecting inwardly of the base. The plate 24 is provided with a plurality of hook shaped latches 27 engaging the pins 26 when the plate is in position on the base. The latches have their hook portions extending rearwardly so that they can be removed from the pins only by moving the plate forwardly. A lock 28 is provided in plate 24 at the rearward end thereof and has a bolt 29 engaging the front wall of the base, thereby normally preventing a forward movement of the plate.

In order to remove the plate from the base it is necessary to insert a key in the lock and withdraw the bolt 29 from engagement with the wall of the base, thus permitting the plate to be moved forwardly to disengage the latches from the pins.

Secured to the upper surface of the base is a guide plate 33, the forward end of which is bent upwardly for the purpose of guiding a piece of paper to a platen 34 mounted upon the base. The base is provided with a square aperture 35 through which the platen mounted upon a plate 36 extends. The plate 36 is attached to the base by a plurality of screws 37 which are accessible only when the cover plate 24 is removed from the base. The exposed portion of the base is covered by a plate 38 which extends forwardly of the base forming a shelf 39. The right side of the shelf 39 is turned upwardly forming a flange 43 which serves as a guide for the check being inserted in the machine.

Plate 38 is provided with three upwardly sloping guide members 44, each of which serves to guide the paper over a stud 45 threaded into the base, the purpose of which will be described later. Two of the studs 45 have a lock nut 46 for preventing the stud from getting out of adjustment while the third stud is provided with a clip 47 frictionally engaging the lower end of the stud to prevent rotation thereof.

An upper frame support 48 has two longitudinal arms 49, which extend parallel along each side of the base. Arms 49 are attached to the base by a plurality of dowel pins 53 extending through aligned apertures in the arms and the base. The dowel pins are driven into the arm far enough that their outer ends are flush with the outer surface of the arms, rendering it impossible to engage the pins to withdraw them from the arms. A bolt 50 passing through each arm from the inside of the base supplements the dowel pins.

In order to remove the dowel pins it is necessary to drive them out from the interior of the base when the cover plate is removed.

Supporting frame 48 bridges the base and is spaced from the base throughout its area except for arms 49 which support the frame on the base. A pair of vertical walls 54 and 55 extend upwardly from the supporting frame 48 and form the sides of a housing for the operating mechanism of the machine. A plate 56 extends from the wall 54 to wall 55 and a pair of spaced lugs 57 are carried by the plate forming a bearing for an operating handle 58. A plurality of reinforcing ribs 59 are integral with the supporting frame 48.

A pair of arms 61 and 62 are mounted within the housing formed by side walls 54 and 55 in fixed relation to the base. Each of the arms is provided with an angle clip 63 riveted to the arm and secured to the supporting frame 48 by a screw 64. A second angle clip 65 riveted to each arm is secured to plate 56 by a screw 66.

Figure 1:
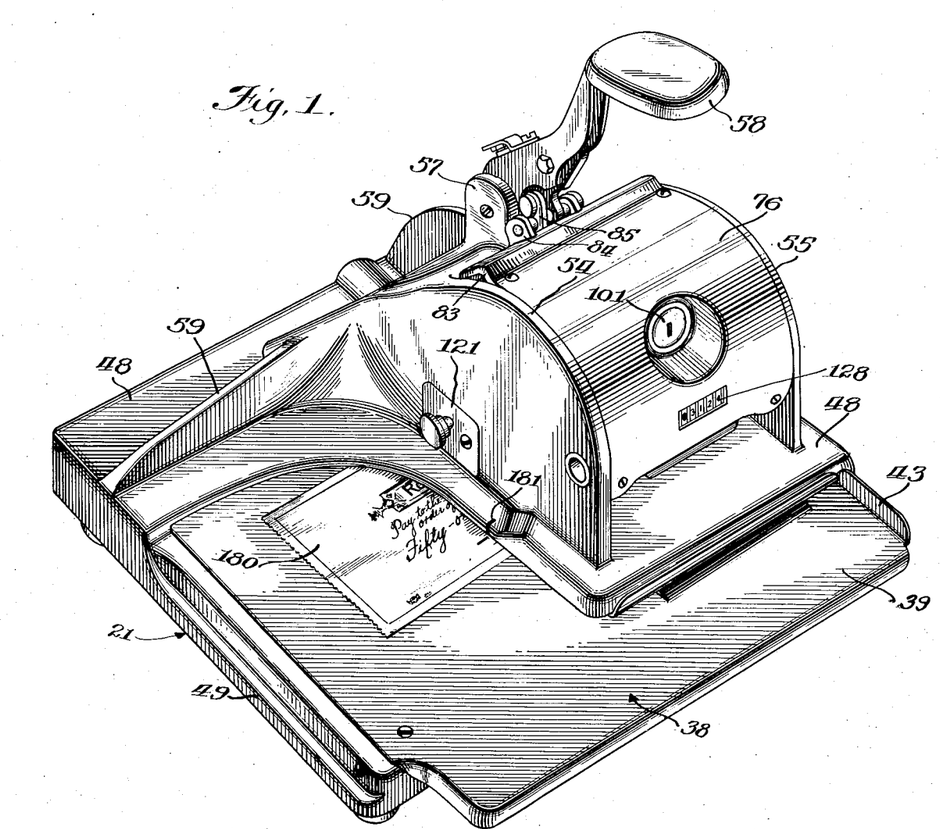
Fig. 1 is a perspective view of the signature affixing machine.
Figure 2:
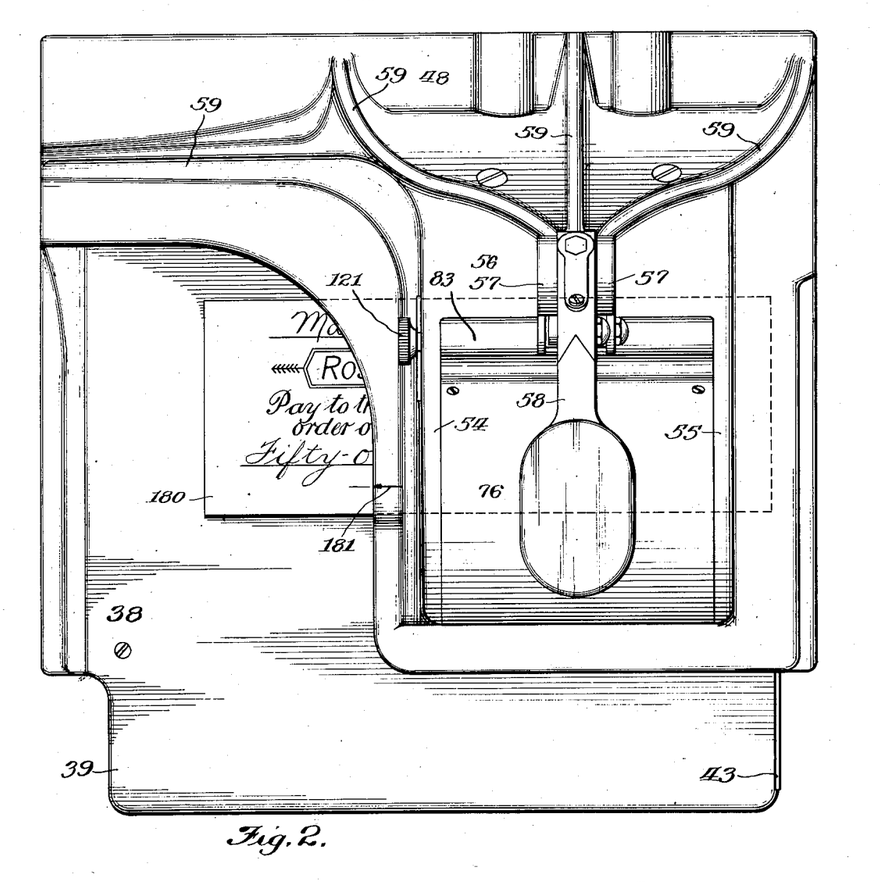
Fig. 2 is a plan view of the machine shown in Fig. 1.
Figure 3:
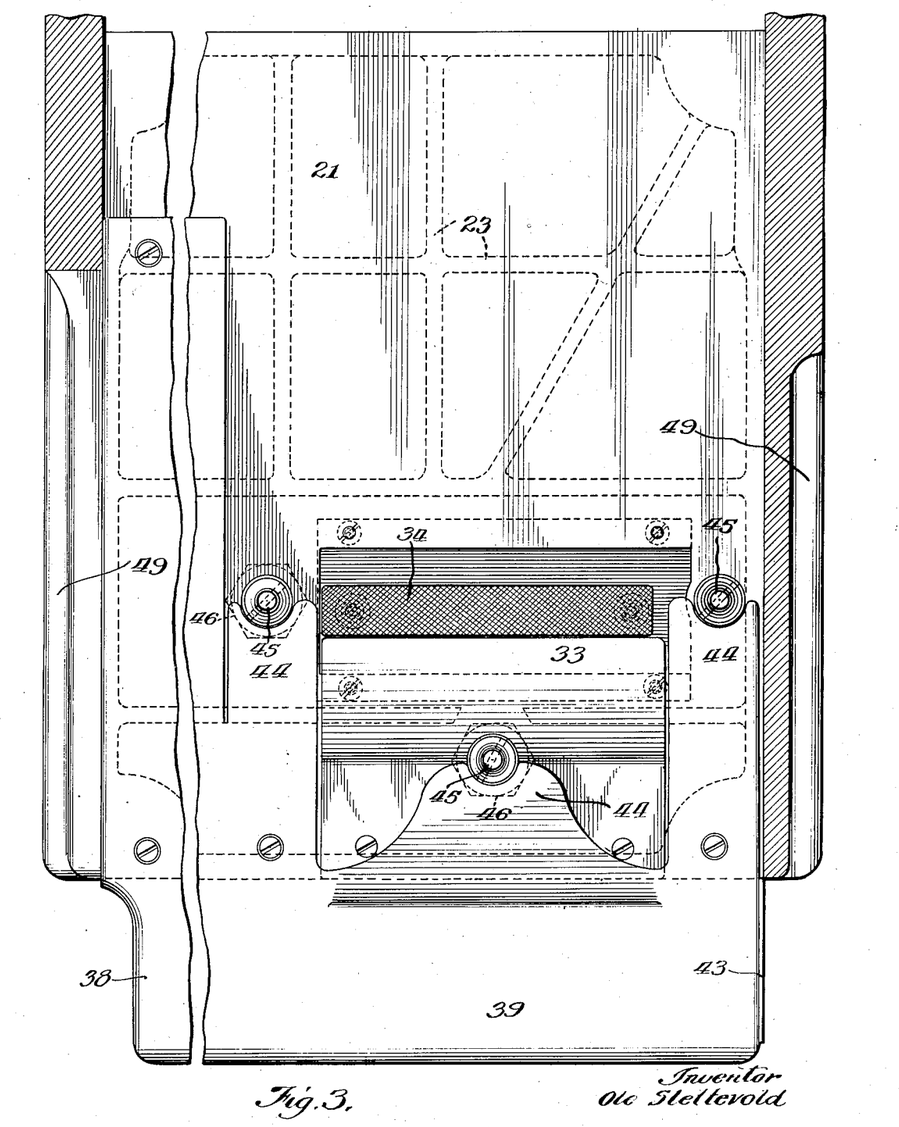
Fig. 3 is a plan view of the base of the machine showing the upper supporting frame in section.
Figure 4:
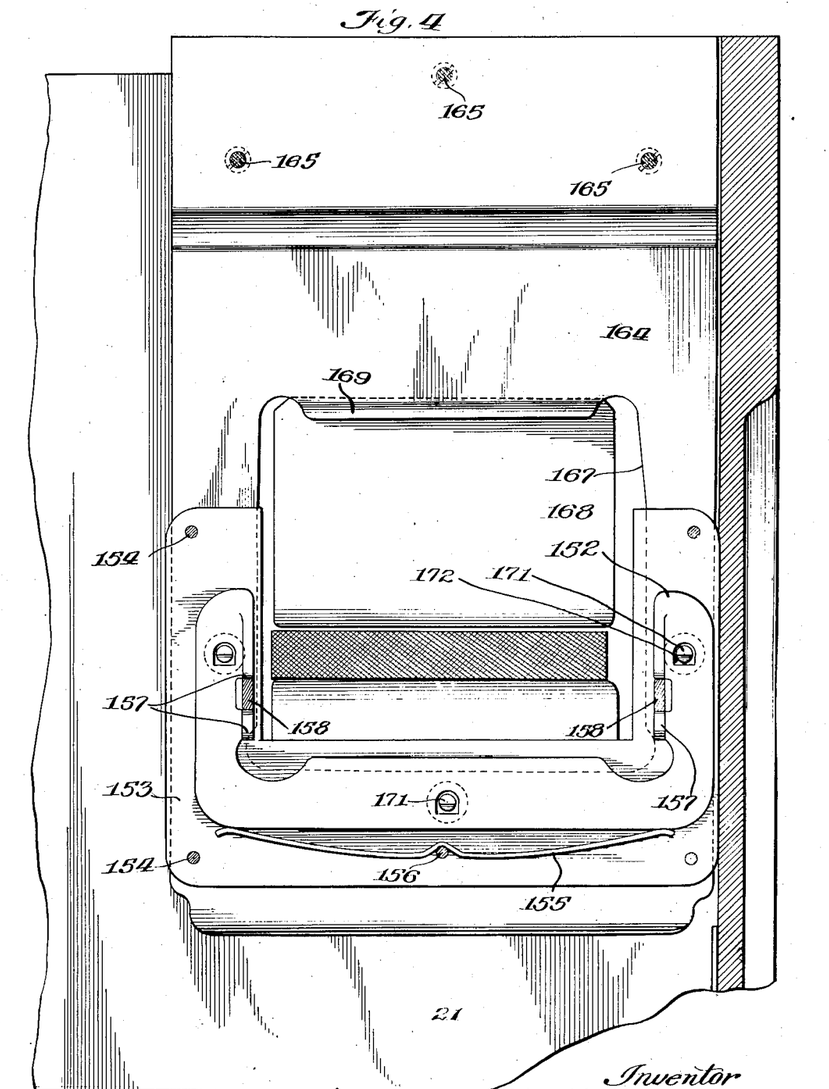
Fig. 4 is a plan view of the machine with the upper frame portion removed showing a part of the structure which is carried by the upper supporting frame.
Figure 5:
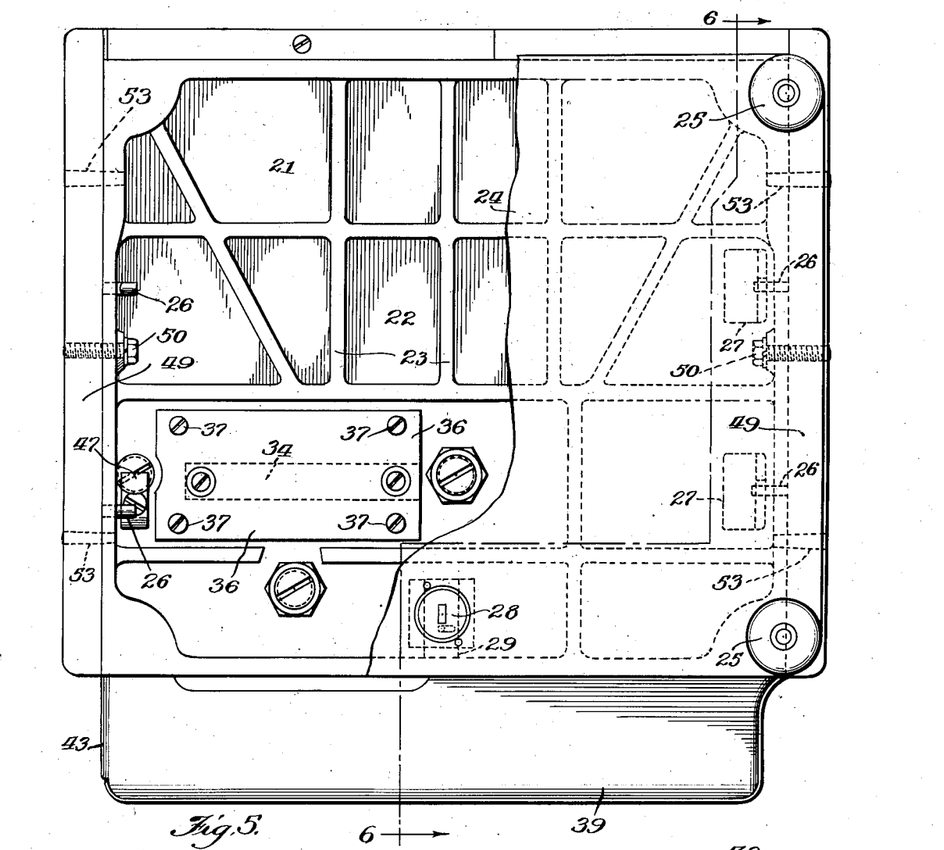
Fig. 5 is a bottom view of the apparatus with a portion of the cover plate broken away to show the platen mounting and the adjustable studs.
Figure 6:
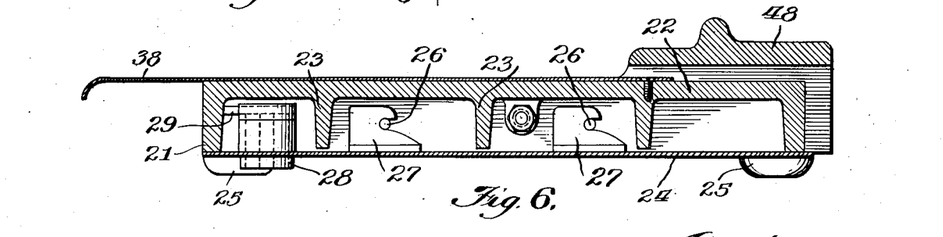
Fig. 6 is a longitudinal section taken on the lines 6—6 of Fig. 5.
Figure 7:
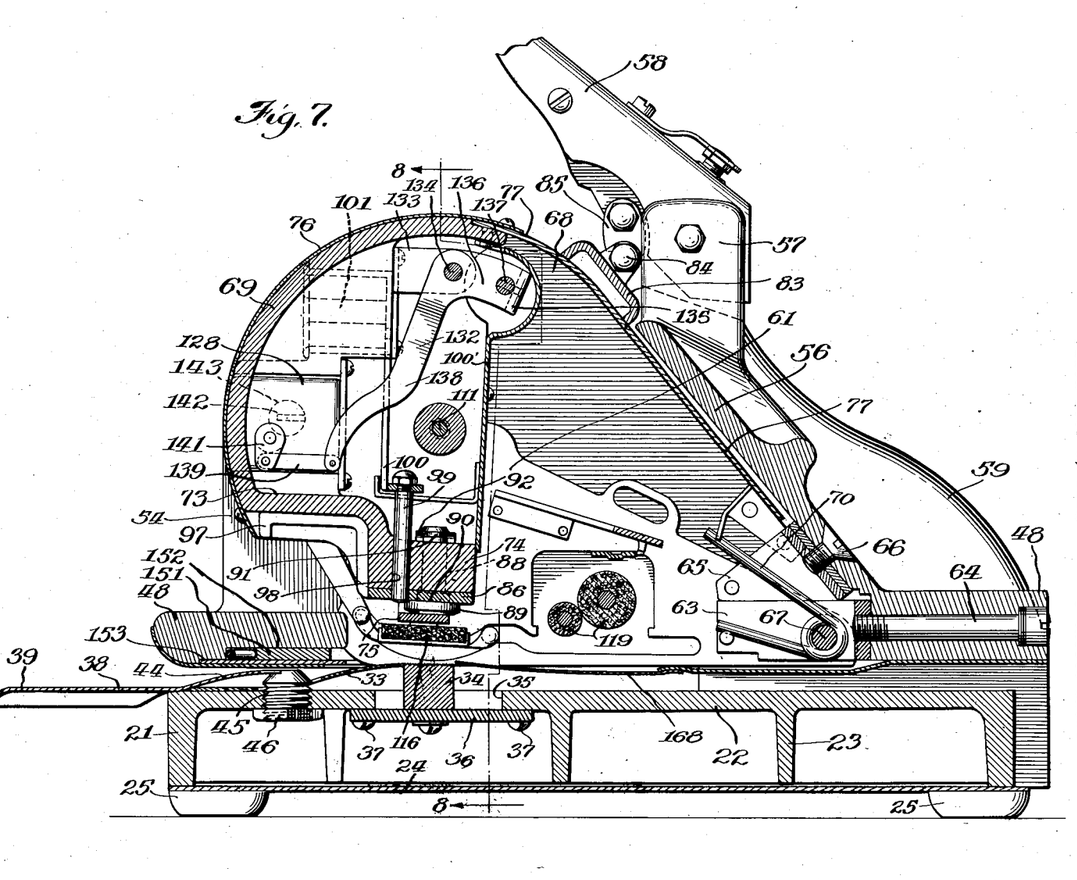
Fig. 7 is a longitudinal section taken on lines 7—7 of Fig. 8.
Figures 8, 9, 10, 13:
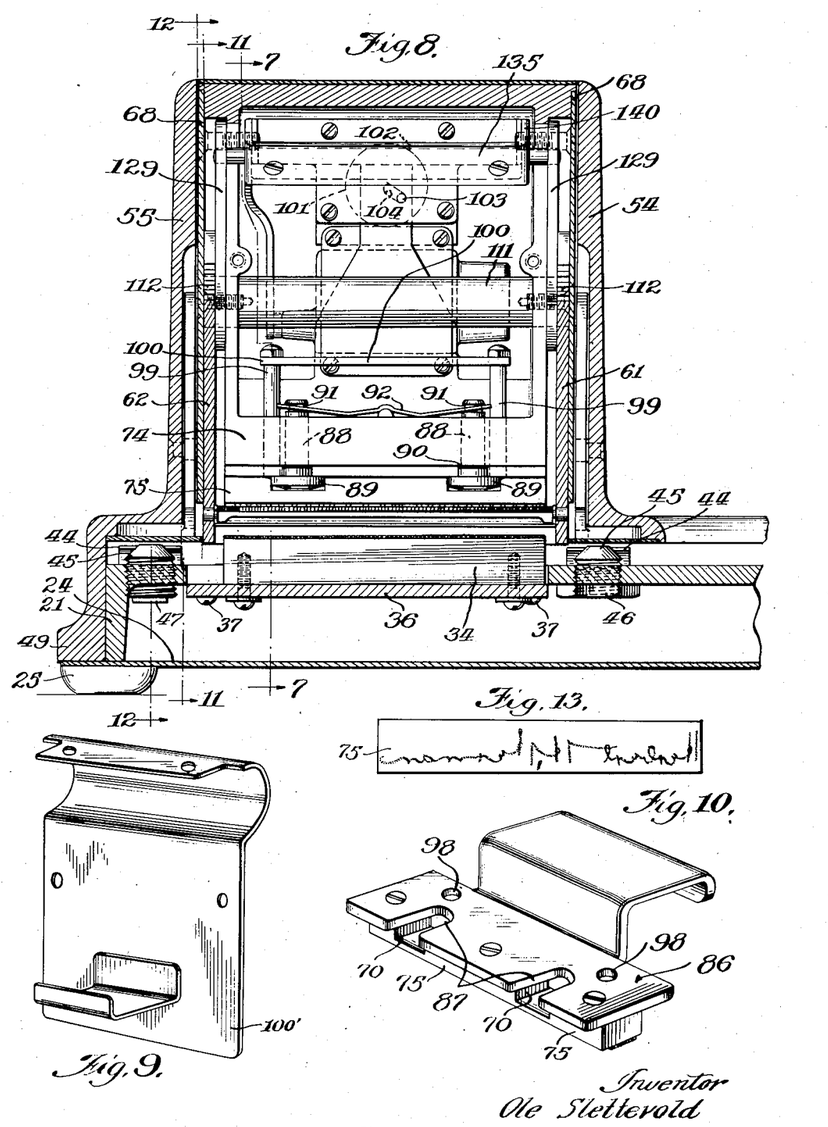
Fig. 8 is a cross section taken on lines 8—8 of Fig. 7.
Fig. 9 is a perspective detail view of a cover plate supported upon the movable die support.
Fig. 10 is a perspective detail view of the die.
Fig. 13 is a view of the face of the die showing the signature in raised projections.

A shaft 67 is journalled in arms 61 and 62 and has pivotally mounted thereon a pair of plates 68. Supported between the rearward ends of plates 68 is a casting 69 having a semi-cylindrical surface extending inwardly at 73 and having a bar 74 integral therewith which serves to support a scarifying die 75 (Figs. 10 and 13). The casting is covered by a plate 76. A cover plate 77 extends between the plates 68 and is attached to the plates by means of screws 78 which pass through ears 79 struck from the plate 77. These screws are covered by the walls 54 and 55 when the machine is assembled, making it impossible to gain access to the screws from the outside.

Extending across plate 77 is a bar 83 having a projection 84 by means of which the bar is attached to handle 58 through a link 85. A downward movement of the handle will be communicated to the bar through the link, causing the plates 68 and casting 69 to move downwardly between walls 54 and 55. Upon release of the handle the plates and the mechanism carried thereby will be returned to their normal positions by a spring 70. The removable die 75 is attached to a plate 86 having a pair of slots 87 therein which overlie similar but larger slots 70 in the die. Extending through the die supporting bar 74 is a pair of bolts 88 having enlarged heads 89 which are adapted to engage slots 70 in the die. Each bolt is provided with a shoulder 90 for spacing the head from the supporting bar. The upper ends of bolts 88 are provided with annular grooves 91 engaged by a spring 92 for resiliently urging the bolts upwardly and holding the die against bar 74.

Integral with plate 86 is a channel-shaped grip 97 by which the die may be manually inserted and withdrawn from the machine. Plate 86 and supporting bar 74 are provided with aligned apertures 98 through which pins 99 extend for the purpose of aligning and securing the die in position. Pins 99 are carried by an arm 100 which extends upwardly to a lock 101. The lock comprises a cylinder 102 having a slot 104 therein engaging a pin 103 of the arm 100. When a key is inserted in the lock and the cylinder 102 is rotated slot 104 will raise the arm 100 to lift the pins 99 out of plate 86, thereby freeing the plate and allowing the die to be removed.

When the key is removed from the lock pins 99 will again drop to their normal position and prevent the insertion of the die unless the key is again inserted in the lock and the pins 99 are raised to permit the insertion of the die.

Supported between movable plates 68 is a shaft 111 which swings about the axis of shaft 67 when the plates 68 are moved. Shaft 111 carries gear sectors 112 which are integral with arms 113. The forward ends of arms 61 and 62 are formed into companion gear sectors 114 which mesh with the gear sectors 112. Thus, as the shaft 111 is moved about shaft 67, the arms 113 will be moved and, since the ratio of the length of arms 113 with respect to the radial distance of the gear sector from shaft 111 is large the ends of arms 113 will move through a comparatively large arc. Each arm 113 is connected by a link 115 to an inking pad 116 which is normally in engagement with the face of die 75.

Arms 61 and 62 are provided with elongated slots 117 into which pins 118 carried by the inking pad extend to guide the inking pad. The first movement of arms 113 will cause the inking pad to recede from the die and thereafter the inking pad will move rearwardly into contact with inking rollers 119. The inking rollers may be of any suitable type well known in the art and a detailed description thereof is therefore not necessary. The end of the shaft upon which the large inking roller 119 is mounted extends through a removable plate 121 attached to wall 54 and may be removed from the machine by removing plate 121.

In order to operate a counting mechanism 128, a pair of sector-shaped arms 129 are mounted upon shaft 111 and are provided with arcuate grooves 130 which have cam-shaped portions 131 at one end. A bell crank lever 132 is mounted on suitable brackets 133 secured to casting 69. A shaft 134 extending through the bell crank lever serves to pivotally mount the lever upon the brackets 133. Bell crank lever 132 is integrally connected by a strip 135 with an arm 140 which is shaped similarly to the other arm of the bell crank lever 132.

Arms 136 and 140 are provided with apertures through which a shaft 137 extends. Shaft 137 extends through these arms and projects into the arcuate slots 130 of arms 129. The other arm 138 of the bell crank lever is connected by a link 139 to an arm 141 of the counting mechanism. The oscillation of arm 129 will not actuate the counting mechanism until the cam portion 131 of the slot is reached. This construction prevents the operation of the counting mechanism unless a signature is actually impressed, and prevents the impression of a signature without actuating the counting mechanism. While the movement of the arm 136 of the bell crank lever will not be very great the ratio of the lengths of the arms 136 and 138 is such as to cause a sufficient movement of arm 141 of the counter to actuate the counter.

The counting mechanism 128 is permanently secured in the casting 69 so that it cannot be removed. If it is desired to reset the counting mechanism a key may be inserted in the cylindrical tumbler support 143, the rotation of the key being effective to re-set the counting mechanism as is well understood in the art.

In order to prevent access to the counting mechanism or the locking mechanism of the die by inserting a sharp or pointed instrument past plate 77, a cover plate 100' is secured to casting 69 enclosing these parts.

The apparatus for preventing more than a single sheet of paper being signed at one time will now be described. The three adjustable studs 45 extend into close proximity to the supporting frame 48 which is spaced a fixed distance from the base. The lower side of the supporting frame has a cut-out portion 151 in which a U-shaped plate 152 is slidably supported. The U-shaped plate is retained in contact with the supporting frame 48 by means of a plate 153 secured to the supporting frame by a plurality of screws 154. U-shaped plate 152 is constantly urged rearwardly by a spring 155 centrally supported by a pin 156 secured to the supporting frame.

Each arm of the U-shaped plate is provided with a pair of upwardly extending lugs 157 between which are free spaces into which one end of levers 158 extend, the levers being pivoted on pins 159 secured in the stationary side walls. The movable plates 68 have portions 160 which are partially severed from the plates and pressed out of the plane of the plates into the path of the upper pointed ends of levers 158. The plates 68 also carry pins 163 which ride upon the rear cam surfaces of levers 158.

A guide plate 164 is secured to the supporting frame 48 by a plurality of screws 165. This guide plate extends forwardly to the end of the supporting frame. Guide plate 164 has a substantially rectangular opening 167 therein. A flexible leaf 168 is welded or otherwise secured to the plate 164 at 169 and is resiliently supported at the welded joint extending rearwardly into close proximity to platen 34. Guide plate 164 is provided with a plurality of pins 171 upon its upper surface. These pins are located directly above the studs 45 and extend upwardly into apertures 172 formed in the slidable plate 152. The pins 171 have a cam-shaped surface upon their forward sides which engage similar cam-shaped surfaces in the apertures.

Upon a downward movement of the plates 68 which carry the movable die support, pins 163 will allow the upper arms of levers 158 to swing forwardly due to the shape of the cam surfaces of levers 158. Spring 155 which constantly urges plate 152 rearwardly therefore becomes effective to move the plate rearwardly, causing the cam surfaces of apertures 172 to engage the cam surfaces of pins 171, forcing the pins 171 and the guide plate to which they are attached downwardly.

When a piece of paper is inserted between the studs 45 and the guide plate 164 pins 171 and guide plate 164 will be urged downwardly until they strike the paper and the downward movement of the guide plate is limited by the thickness of the paper. If the paper is of such thickness that pins 171 cannot be forced down sufficiently far to clear plate 152 in its forward movement, levers 158 will be retained in such a position as to engage the projections 160 of the plates 68, thereby preventing the downward movement of the plates 68 and the movable die support to prevent the impressing of a signature upon the paper.

The operation of the apparatus is as follows: A check 180 is aligned with the flange 43 and then moved rearwardly under the supporting frame 48 until the line upon which the check is to be signed is in alignment with a mark 181 on the supporting frame. Guide fingers 44 guide the check over the studs 45 as the check is being inserted and the guide 33 guides the check upwardly over platen 34. The check will pass under the resiliently mounted leaf 168 which directs the check rearwardly and at the same time prevents it from coming in contact with the inking mechanism.

Figure 11:
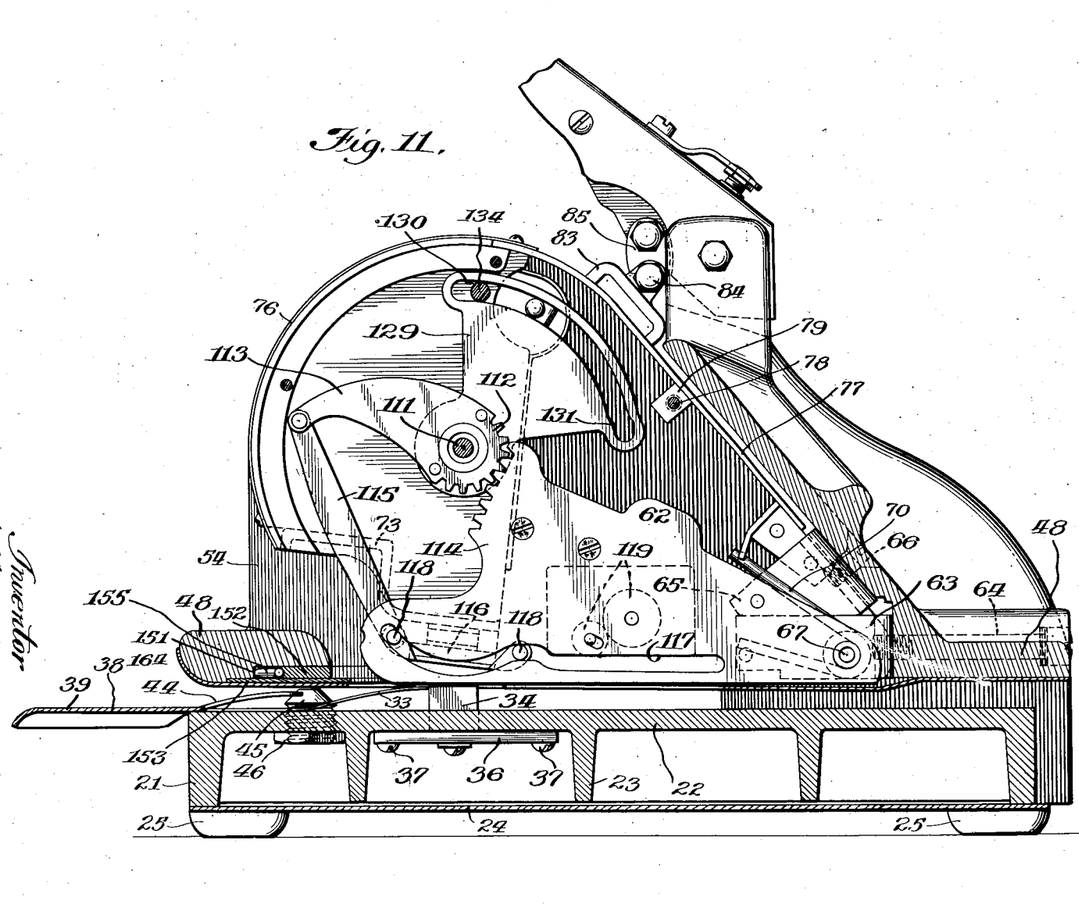
Fig. 11 is a longitudinal section taken on lines 11—11 of Fig. 8.
Figure 12:
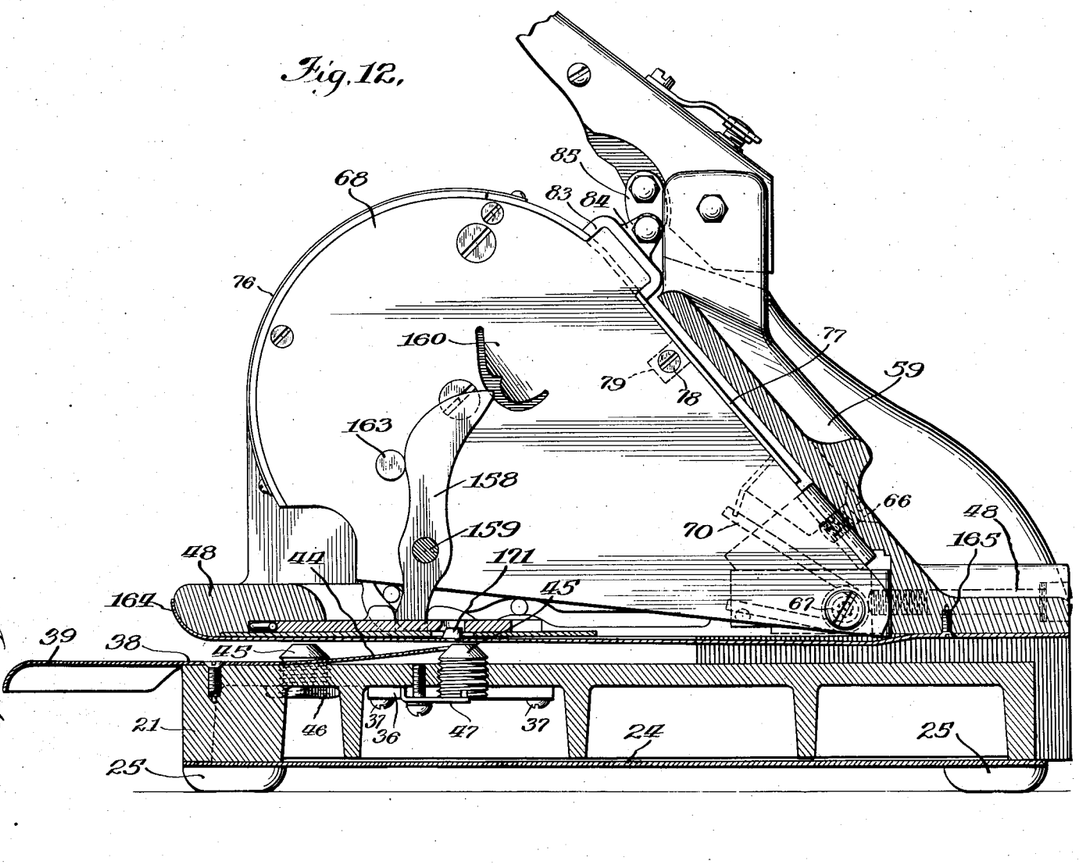
Fig. 12 is a longitudinal section taken on lines 12—12 of Fig. 8.
Figure 14:
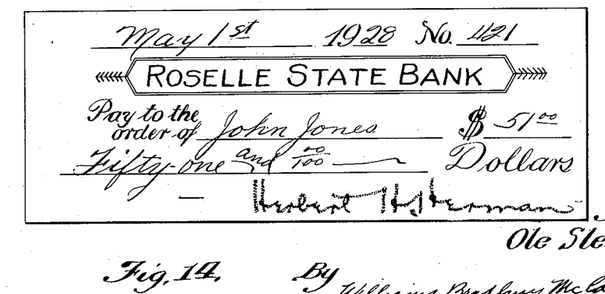
Fig. 14 is a facsimile of a check signed by the apparatus.

Handle 58 is then pressed downwardly, causing the movable structure between walls 54 and 55 to move downwardly, which movement causes the die 75 to move toward the check which rests upon the upper surface of the platen 34. The downward movement of the die supporting structures causes counter clockwise movement (Fig. 11) of gear sector 112 to remove the inking pad from the die rearwardly under the inking rollers. As the end of the downward stroke of handle 58 is reached the counting mechanism will be operated as described above to indicate that a check has been signed. If the check is made of thicker paper than that which the machine is adjusted to sign or if it is attempted to sign two checks at one time pins 171 will engage plate 152, preventing the plate from moving rearwardly far enough for levers 158 to clear the projections 160 on plates 68 and thus render the machine inoperative to sign the checks.

One of the outstanding features of the invention is the fact that the apparatus cannot be taken apart to gain access to the printing die or the counting mechanism without first removing the supporting frame from the base and, since the supporting frame cannot be removed from the base without the key for unlocking the cover plate of the base, an effective safeguard is provided to prevent unauthorized manipulation of the machine. The die when not in use is usually removed from the machine and placed in the safe of the person whose signature it bears.

When a number of checks are to be signed the person in charge may himself place the die in the machine and re-set the counting mechanism so that after the checks have been signed he can refer to the counting mechanism to ascertain whether any more checks than have been authorized have been signed.

Having thus described the nature and embodiments of my invention, what I claim as new and desire to secure by United States Letters Patent is as follows:

1. An apparatus of the class described comprising a platen, a die cooperating therewith to produce a scarified signature on an instrument, means for guiding the instrument between the platen and die, operating means for causing relative movement between the platen and die to impress the signature, means for preventing said operating means from operating when the thickness of the instrument varies from a predetermined standard, and means for adjusting said last mentioned means to accommodate any selected standard of thickness of an instrument.

2. In an apparatus of the class described, a platen, a base for supporting the platen, a key operated locking device for preventing removal of the platen from the base, a die for cooperating with the platen to produce a scarified signature, a support for said die, a key operated locking device for preventing removal of the die from the support, operating means for causing relative movement of the platen and die to produce the signature, means responsive to said movement to record the number of signatures produced, and a key operated means for re-setting the recording means.

3. In an apparatus of the class described a base, a platen having an irregular surface mounted on the base, a fixed support spaced from the base, a resilient guide member attached to the support, an adjustable stud projecting upwardly through the base into close proximity to the support, a cover plate for the base for preventing access to the die and to the adjustable stud, a printing die cooperating with the platen, operating means for relatively moving the platen and die to produce a signature on a piece of paper inserted between the stud and resilient guide member, and means for preventing the operating means from operating when the thickness of the paper inserted between the stud and resilient guide member exceeds a predetermined value.

4. In an apparatus of the class described the combination of a base, a platen mounted thereon, a die cooperable therewith to produce a signature, a movable support for the die, an inking pad for the die, a counter for indicating the number of signatures produced by the die, a shaft carrying a gear sector supported by the movable die support, a companion gear sector attached to the base, means for moving the movable die support and die toward the platen, thereby rotating the gear sector carried by the shaft, and means responsive to said rotation of the gear sector to remove the inking pad from the die and actuate said counter, said means comprising a cam on said last named gear sector having a dwell portion throughout substantially the whole length of the camming surface thereof, and a rising portion immediately adjacent the end of said camming surface.

5. An apparatus of the class described comprising a base, a platen mounted on the base, an adjustable stud projecting upwardly through the base, a fixed support spaced from the base, a resilient guide carried by the support, a horizontally movable member carried by the support and having an aperture therein, a projection secured to the resilient guide member adapted to engage the aperture of the horizontally movable member and to be retained therein when a paper of greater than a predetermined thickness is inserted between the adjustable stud and the resilient guide, a pivotally mounted arm adapted to be actuated by the horizontally movable member, a die cooperable with the platen to produce a signature, a movable die support for moving the die toward the platen, said pivoted arm preventing movement of the die support when the projection of the resilient guide is retained in the aperture of the horizontally movable member by the thickness of the inserted paper.

6. An apparatus of the class described comprising a stationary base, a stationary support having a surface spaced from the base, an adjustable member extending through the base into close proximity to the support, a guide between the adjustable member and the support, a platen mounted on the base, a movable die cooperable therewith to impress a signature, and means cooperating with the guide to prevent the movable die from impressing a signature when a paper of greater thickness than a selected standard is inserted between the adjustable member and the guide.

7. In an apparatus of the class described, a die support provided with an aperture, a bolt having an enlarged head resiliently mounted on said support, a die having a portion for engaging the head of the bolt and provided with an aperture adapted to be aligned with the aperture in the support when it engages the head of the bolt, a pin for entering said apertures to align and secure the die upon the support, and key controlled means for inserting and withdrawing the pin from said apertures.

8. An apparatus of the class described comprising a base, a platen having an irregular surface mounted on the base, a plurality of adjustable studs projecting upwardly through the base, a support mounted on the base having a portion extending over and spaced from the adjustable studs, a guide member for guiding a piece of paper over the studs, a resilient guide member above the studs and contacting with the support, a horizontally movable member carried by the support and having a plurality of apertures therein, a spring for urging the horizontally movable member forwardly, projections secured to the upper side of the resilient guide member directly above the studs and adapted to engage the apertures in the horizontally movable member, said horizontally movable member forcing the projections downwardly to engage the guide with the paper, a pivoted arm adapted to be oscillated by the horizontally movable member, a printing die, a movable support for the die, and a projection on the movable support, said pivoted arm being adapted to engage the projection on the movable support when the thickness of the paper prevents the resilient guide from moving downwardly far enough for the projections on the guide to move clear of the horizontally movable member.

9. In a machine of the class described, the combination of a base, a platen secured to said base, a plurality of stops adjustably mounted in said base, a signature imprinting and scarifying die mounted for movement to and from said platen, operating means for moving said die toward said platen, a lock for said operating means, and means adapted to contact with a paper instrument upon which a signature is to be imprinted and scarified at a point opposite said stops and adapted to hold said locking means in locking position whenever the paper instrument is of greater than a predetermined maximum thickness.

10. In a machine for automatically imprinting and scarifying signatures upon negotiable instruments, the combination of a pair of relatively movable imprinting and scarifying dies, operating means to relatively move said dies in a printing operation, a pair of sensing members, one of said members being rigid with respect to one of said dies and the other of said members being normally movable with but capable of limited movement relative to the other of said dies, locking means normally positioned to prevent actuation of said operating means, and means controlled by said last-named member to prevent movement of said locking means from locking position upon a predetermined movement of said member.

11. In a machine for imprinting and scarifying signatures upon negotiable instruments, the combination of a base, a platen carried thereby, a frame movable relative to said base, a signature imprinting die carried by said frame, a lock member pivotally mounted on a member fixed relative to said base and cooperable with a portion of said frame to arrest movement thereof, and means controlled by the thickness of the instrument inserted between said platen and said die to control said lock member.

12. A machine of the class described comprising a pair of relatively movable dies cooperable to imprint a signature upon an instrument, a plurality of gauging elements adjacent one of said dies, sensing means normally movable with but capable of limited movement relative to the other of said dies, operating means for relatively moving said dies to imprint the signature upon the instrument, an interlock to prevent complete operation of said operating means, and means for rendering said interlock effective when said sensing means is moved relative to said die with which it normally moves.

13. In a machine of the class described, the combination of means for scarifying and imprinting a signature upon an instrument and means to prevent operation of said means when it is endeavored to imprint and scarify an instrument of greater than standard thickness, said means comprising a plurality of members relatively movable into engagement with the opposite sides of the instrument thereby to gauge the thickness thereof, a movable stop associated with one of said members, and a locking element held in locking position upon a predetermined movement of said stop.

14. In an apparatus of the class described, a die support having an aperture therein, a die having an aperture adapted to be aligned with the aperture in the support, a pin movable in said apertures to align the die upon the support and prevent movement of the die in the plane of the support, resilient retaining means for holding said die in position on the support allowing limited movement in a direction normal to the support, and guide means cooperating with said retaining means allowing movement in one direction only in the plane of the support.

15. An apparatus of the class described comprising a platen, a scarifying die cooperating therewith to impress a signature, a register for indicating the number of signatures made, operating means for causing relative movement of the platen and die to impress the signature, and actuating means for said registering means connected to said operating means by a pin cooperating within a slot, said slot having a cam portion cooperable with said pin to actuate said registering means during the scarifying operation.

OLE SLETTEVOLD.